United States Patent [19]

Thillays

[11] Patent Number: 4,632,504
[45] Date of Patent: Dec. 30, 1986

[54] METHOD OF COUPLING TWO OPTICAL ELEMENTS TO FORM AN OPTICAL DATA TRANSMISSION DEVICE, AND DEVICE THUS OBTAINED

[75] Inventor: Jacques C. Thillays, Herouville St Clair, France

[73] Assignee: U.S. Philips Corporation, New York, N.Y.

[21] Appl. No.: 581,483

[22] Filed: Feb. 17, 1984

[30] Foreign Application Priority Data

Mar. 2, 1983 [FR] France .................................. 83 03418

[51] Int. Cl.[4] ................................................ G02B 6/42
[52] U.S. Cl. .............................. 350/96.20; 350/96.10; 357/17; 357/30
[58] Field of Search ................. 350/96.20; 357/17, 74, 357/30

[56] References Cited

U.S. PATENT DOCUMENTS

| 4,017,962 | 4/1977 | Palmer ......................... 350/96.12 X |
| 4,192,574 | 3/1980 | Henry et al. ...................... 350/96.17 |
| 4,302,070 | 11/1981 | Nakayama et al. ........... 350/96.21 X |
| 4,316,204 | 2/1982 | Inagaki et al. ................ 350/96.20 X |

FOREIGN PATENT DOCUMENTS

| 2446497 | 8/1980 | France .............................. 350/96.20 |
| 0113111 | 9/1981 | Japan ................................ 350/96.20 |

OTHER PUBLICATIONS

Burris, C. A., et al., "Efficient Small-Area GaAs-Ga$_{1-x}$Al$_x$As Heterostructure Electroluminescent Diodes Coupled to Optical Fibres," *Proc. IEEE*, Aug. 1971, pp. 1263–1264.

*Primary Examiner*—William L. Sikes
*Assistant Examiner*—Akm E. Ullah
*Attorney, Agent, or Firm*—Marc D. Schechter

[57] ABSTRACT

A method of coupling an optical fiber (6) and an optoelectronic component which is formed in a semiconductor body whose surface is provided with metallic contact pads. The pads are connected, via connection wires, to external metallic layers on a support. In the method one end of the optical fiber is guided between beads formed on the surfaces of the contact pads and rests on these pads.

4 Claims, 2 Drawing Figures

METHOD OF COUPLING TWO OPTICAL ELEMENTS TO FORM AN OPTICAL DATA TRANSMISSION DEVICE, AND DEVICE THUS OBTAINED

BACKGROUND OF THE INVENTION

The present invention relates to a method of coupling two optical elements to form an optical data transmission device. In the method a first optical element must be centered with respect to a second optical element. The first element is an optical fiber. The second element is an optoelectronic component. The optoelectronic component is provided with at least one junction formed in a semiconductor body. The contact terminals are metallic layers which are provided on the surface of the semiconducting regions of the body. The active face of one end of the fiber is positioned opposite the optoelectronic component so that the transfer efficiency of the light rays transmitted by the fiber is optimum. The assembly is then retained in this position until it is enclosed in an opaque plastic material. The plastic forms an envelope which is impenetrable to external light rays.

The present invention also relates to the device obtained by this method.

In the field of telecommunications, it is known to replace coaxial electrical links between electronic devices with optical links. The optical links use optical fibers which are cabled and which connect light sources and photoreceivers.

These optical fibers, being able to carry high-frequency signals, offer the advantage that they are insensitive to external parasitic disturbances. They also have an attenuation factor which is smaller than that of the conventional coaxial cables.

For reasons concerning weight and volume and, of course, for economical reasons, the diameter of the active section of an optical fiber has nowadays become standardized at approximately 50 μm. Such a fiber is generally used with an electronic component, notably a light source, which is formed a semiconductor crystal whose photoactive junction has a substantially equivalent diameter. Under these circumstances, and knowing that the acceptance angle of an optical fiber may be no larger than 10°, it will be evident that if the light source is not properly aimed or if the active face of the fiber, that is to say the face opposite the semiconductor junction, is not positioned with precision, the transfer or coupling efficiency is substantially reduced.

In order to achieve optimum data transmission in a fiber, therefore, it is desirable to introduce a maximum amount of light into the fiber and to position the source and the active face with high precision. It follows from this that for positioning a fiber, which is barely visible to the unskilled eye, opposite a light source, having a diameter which is equivalent to that of the fiber major technical difficulties are encountered.

When coupling an optical fiber to a photoreceiver optoelectronic component however, the problem of centering one element with respect to the other is not so difficult. This is because the photoreceiver element in known devices is generally a semiconductor diode whose junction diameter is larger than that of the section of the active face of the fiber. Thus, a margin of error is provided positioning and centering the elements. However, if the surface of the photoreceiver diode is to be reduced with respect to that of the section of the fiber, the same difficulties will be encountered as during the centering of a fiber with respect to a source.

In order to facilitate the assembly of a fiber transmission device, the optoelectronic components, or end components, are often connected to a data transfer fiber via a a pigtail fiber. The pigtail fiber is permanently connected to the component. This requires perfect centering of the pigtail fiber with respect to the optoelectronic component.

A recent type of fiber transmission devices is provided at each of its ends with an optoelectronic component which is supported by a metallic support. The component is enclosed in an opaque plastic envelope. Within this envelope and opposite optoelectronic component there is formed a duct in which one end of the transfer fiber or the pigtail fiber is inserted and secured.

It will be apparent that it is comparatively difficult to center the optoelectronic component with respect to the fiber. This is because the component is mounted on a flat surface of a comparatively wide support which serves as a base as well as a dissipator. This is also because the tolerances of the diameters of the optical fiber and the duct which are necessary for easy insertion of the fiber often require substantial clearance between these various elements.

Between the instant at which the fiber is aligned with respect to the optoelectronic component and the instant at which the fiber is secured in the duct, generally a comparatively long period of time expires during which the components must be retained in their initial position.

Only a few methods are known as present for accurately aligning a fiber and light source or receiver. In most cases, these methods involve many operations and require high mechanical precision, so that they are expensive.

A currently used method utilizes a so-called "Burrus diode". The active face of the end of the optical fiber is placed at the bottom of the cavity of the diode. However, despite the care taken in the positioning of the elements, the assembly precision remains insufficient. This lack of precision is not only caused by the aggregate tolerances of the dimensions of the cavity and the optical fiber, but also by the shrinking or shifting of the resin during its polymerization. The lack of precision thus leads to a mediocre transfer efficiency.

SUMMARY OF THE INVENTION

It is an object of the present invention to optically connect a fiber to an optoelectronic component with a high optical connection efficiency. In order to achieve this object, the invention utilizes the fact that the best way to achieve a high light transfer between an optical fiber and an optoelectronic component is to arrange the active face at the end of the fiber as near as possible to the semiconductor junction of the component. The invention is also based on the progress achieved in local metal deposition techniques customarily used in the semiconductor industry for transistors or integrated circuits.

The invention thus relates to a method of coupling an optical fiber to an optoelectronic component which is provided with at least one junction formed in a semiconductor body and whose contact terminals are metallic layers which are provided on the surface of the various semiconducting regions of the body. The active face of one end of the fiber is positioned opposite the component so that the transfer efficiency of the light rays transmitted by the fiber is optimum. The assembly is then maintained in this position until it is enclosed in an opaque plastic material which forms an opaque envelope which is impenetrable to external light rays. When the connection wires are bonded to the metallic contact pads by thermocompression, there are formed thereon partly spherical beads. The section of each bead is larger than that of the wires. The beads are situated so that they circumscribe a circular zone whose diameter equals that of the optical fiber. The end of the optical fiber is slid between the beads so that the active face is pressed against the metallic contact pads of the optoelectronic component. The end of the fiber is then immobilized in this position before the opaque plastic protective envelope is provided.

The use of this method offers many advantages. It has been found that, without taking special precautions, the positioning of the optical fiber opposite the optoelectronic component results in very good transfer efficiencies.

Moreover, this method can be performed without using supplementary operations and/or special equipment. It is advantageous, for example, that the connection wires can be bonded to the metallic contact pads by means of a thermocompression method which is known to experts, as "nail head bonding".

In "nail head bonding", the end of a wire is formed into a spherical shape. The spherical end is then lowered and pressed onto the metallic contact pad of the optoelectronic component. After pressing, the spherical end becomes thickened. Thus, at the same time the connection wires are bonded, the partly spherical beads according to the invention are formed.

The four beads are substantially spherical. The guiding of the fiber is thus aided by the rounded contours which form a funnel. The use of equipment specially adapted for this bonding method precisely positions the beads (with a resolution on the order of 4 μm), operates fast (deposits 4 beads per second), and automatically operates based on manual programming.

In order to facilitate programming of the deposition operation and to ensure support of the end of the optical fiber at least three points, there are preferably at least four metallic contact pads and beads covering these pads.

The method according to the invention can be used for all types of optical fiber transmission devices, but is of particularly interest for devices with so-called lateral fiber exit. This is because, as is known, the fiber transmission devices are usually mounted on printed circuits provided on parallelly connected plug-type boards. The space between the boards is therefore limited. Consequently, the optical fiber emerging from each of the devices is preferably oriented in a direction parallel to the planes of the boards rather than in a direction perpendicular thereto.

The present invention also relates to the optical data transmission device obtained by the described method. This device includes notably two optical elements, the first of which is formed by at least one optical fiber. The second element is an optoelectronic component which is formed in a semiconductor body. The contact terminals of the component are surface metallic layers. The two optical elements are retained and enclosed in an opaque plastic material. The end of the optical fiber is locked between partly spherical metallic beads deposited on the surfaces of the contact pads of the device.

DESCRIPTION OF THE PREFERRED EMBODIMENTS

Figure 1:
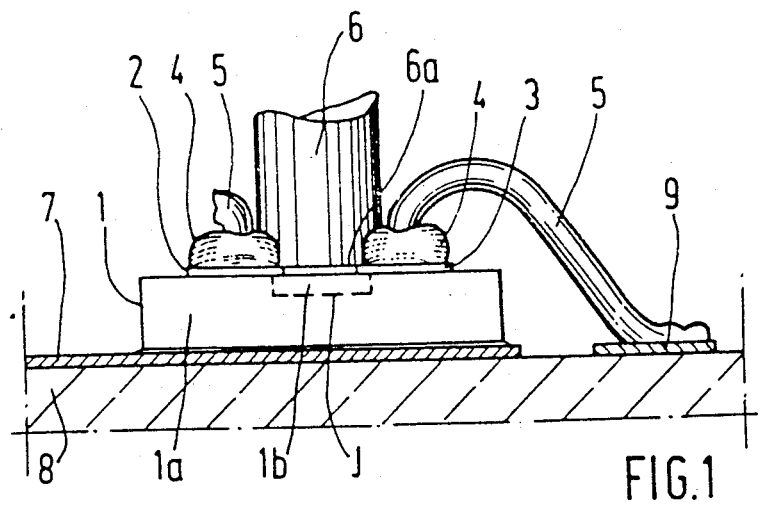
FIG. 1 is a front view, partly in section of the optical data transmission device obtained by the method according to the invention.

It is to be noted that the dimensions in the figures are substantially exaggerated and out of proportion for the sake of clarity. the drawing.

Figure 2:
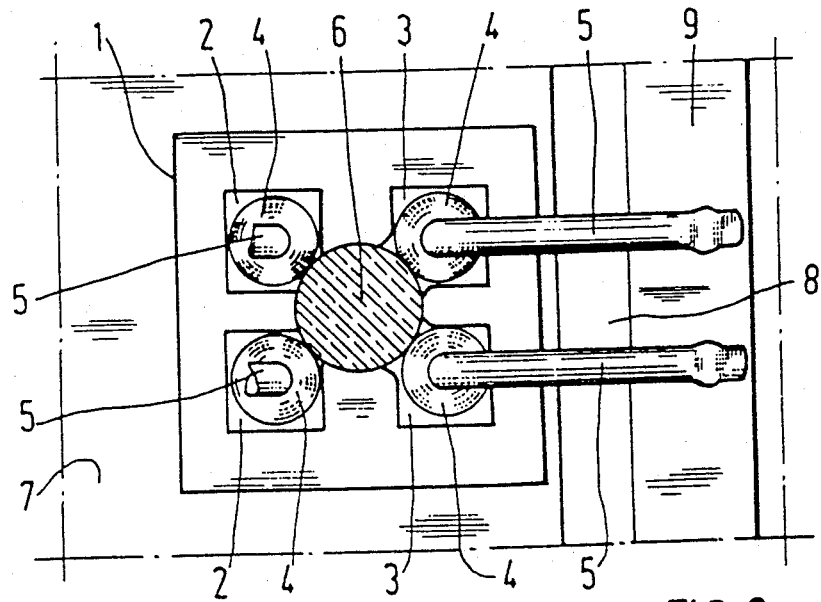
FIG. 2 is a plan view of the same device.

As appears from the FIGS. 1 and 2, the method accoding to the invention utilizes a semiconductor crystal 1 which is soldered to a metallic layer 7 on an insulating support. Crystal 1 has an assembly of metallized pads 2 and 3 which are suitably situated around a junction J. Metallic beads 4 are formed on pads 2 and 3 by a thermocompression bonding machine which. Beads 4 fix the connection wires 5 to pads 2 and 3. Each bead 4 is actually obtained by crushing a sphere previously formed at the end of the connection wire 5.

The metallic beads 4 thus serve to circumscribe a region in which the optical fiber 6 is to be simply lodged along the same axis and very near to the junction J. The active face 6a of fiber 6 then rests against the pads 2 and 3. The fiber 6 is guided by beads 4.

The second function of the beads is to establish electrical contact with the regions 1a and 1b of the semiconductor crystal 1 via the metallic pads 2 and 3 and metallic layers such as the layer 9 deposited on the insulating support 8.

Preferably, there are four metallic beads 4, so that in case a bead slightly shifts, the fiber 6 is still guided by more than two points.

The assembly formed by the semiconductor crystal, the metallic pads, the beads, the wires and the end of the fiber is subsequently enclosed in a protective envelope of an opaque plastic material (not shown in the drawing).

What is claimed is:

1. A method of coupling an optical fiber to an optoelectronic component, said optical fiber having an end with a diameter, said optoelectronic component having at least three metal contact pads on a surface of a semiconductor body, said method comprising the steps of:

bonding wires to the metal contact pads by forming partly spherical beads on the metal contact pads, the beads having cross-sections parallel to the surface of the semiconductor body, said bead cross-sections being larger than cross-sections of the wires parallel to the surface of the semiconductor body, said beads circumscribing a circular zone having a diameter equal to the diameter of the end of the fiber;

sliding the end of the optical fiber between the beads to bring the end of the fiber in contact with the metallic contact pads;

immobilizing the end of the optical fiber in its position between the beads and in contact with the metallic contact pads; and enclosing the assembly of the optoelectronic component and the end of the optical fiber in an opaque plastic material.

2. A method as claimed in claim 1, characterized in that the wires are bonded to the contact pads by thermocompression.

3. A method as claimed in claim 2, characterized in that the optoelectronic component has four metal contact pads.

4. An optical data transmission device comprising:
- an optoelectronic component having at least three metal contact pads on a surface of a semiconductor body;
- a partly spherical bead bonded to each metallic contact pad, each bead bonding a wire to the contact pad, each bead having a cross-section parallel to the surface of the semiconductor body, said bead cross-sections being larger than cross-sections of the wires parallel to the surface of the semiconductor body, said beads circumscribing a circular zone having a diameter;
- an optical fiber having an end with a diameter equal to the diameter of the circular zone, the end of the optical fiber being arranged in the circular zone between the beads and in contact with the metallic contact pads;
- an opaque plastic envelope enclosing the optoelectronic component and the end of the optical fiber.

* * * * *